(12) United States Patent
Apfel

(10) Patent No.: US 11,097,378 B2
(45) Date of Patent: Aug. 24, 2021

(54) CONDUCTIVE NODES

(71) Applicant: Zephyros, Inc., Romeo, MI (US)

(72) Inventor: Jeffrey R. Apfel, Shelby Township, MI (US)

(73) Assignee: ZEPHYROS, INC., Romeo, MI (US)

( * ) Notice: Subject to any disclaimer, the term of this patent is extended or adjusted under 35 U.S.C. 154(b) by 225 days.

(21) Appl. No.: 15/764,628

(22) PCT Filed: Oct. 28, 2016

(86) PCT No.: PCT/US2016/059453
§ 371 (c)(1),
(2) Date: Mar. 29, 2018

(87) PCT Pub. No.: WO2017/075441
PCT Pub. Date: May 4, 2017

(65) Prior Publication Data
US 2018/0318967 A1 Nov. 8, 2018

Related U.S. Application Data

(60) Provisional application No. 62/248,030, filed on Oct. 29, 2015.

(51) Int. Cl.
| | | |
|---|---|---|
| *B23K 35/02* | (2006.01) |
| *C09J 163/00* | (2006.01) |
| *B23K 35/30* | (2006.01) |
| *B23K 35/36* | (2006.01) |
| *B23K 11/11* | (2006.01) |
| *B23K 11/16* | (2006.01) |
| *C09J 11/04* | (2006.01) |
| *C08K 3/08* | (2006.01) |
| *B23K 101/00* | (2006.01) |
| *C08K 7/18* | (2006.01) |

(52) U.S. Cl.
CPC .......... *B23K 35/025* (2013.01); *B23K 11/115* (2013.01); *B23K 11/16* (2013.01); *B23K 35/0244* (2013.01); *B23K 35/30* (2013.01); *B23K 35/3053* (2013.01); *B23K 35/3612* (2013.01); *B23K 35/3613* (2013.01); *C09J 11/04* (2013.01); *C09J 163/00* (2013.01); *B23K 2101/001* (2018.08); *C08K 7/18* (2013.01); *C08K 2003/0856* (2013.01)

(58) Field of Classification Search
CPC ..... B23K 35/025; B23K 11/115; B23K 11/16; B23K 35/0244; B23K 35/3053; B23K 35/3613; C09D 11/04
See application file for complete search history.

(56) References Cited

U.S. PATENT DOCUMENTS

| | | | | |
|---|---|---|---|---|
| 4,195,215 A | * | 3/1980 | Clarke | ................. B23K 11/163 219/91.21 |
| 4,559,373 A | | 12/1985 | Guthrie | |
| 4,661,675 A | * | 4/1987 | Guthrie | ..................... C09J 5/06 219/91.21 |

OTHER PUBLICATIONS

Chinese First Office Action dated Feb. 3, 2020, Application No. 201680062047.8.
Chinese Second Office Action dated Dec. 4, 2020, Application No. 201680062047.8.

* cited by examiner

*Primary Examiner* — Scott R Kastler
(74) *Attorney, Agent, or Firm* — The Dobrusin Law Firm, P.C.; Bryan S. Lemanski

(57) ABSTRACT

A weldable adhesive or sealant formulation comprising a plurality of discrete solid metallic portions within a material having a viscosity of greater than 10,000 Pa s in its green state and at room temperature.

19 Claims, No Drawings

CONDUCTIVE NODES

FIELD OF THE INVENTION

The present teachings relate generally to weldable sealants and adhesives. More specifically, the present teachings relate to sealants and adhesives including a solid metallic component.

BACKGROUND OF THE INVENTION

Weldable sealant and adhesive formulations often utilize conductive fillers (e.g., carbon black, iron phosphide, graphite, iron powder, nickel powder, and the like) that result in the sealants/adhesives having a relatively narrow region of green state (e.g., pre-activation) viscosity. Lower viscosity formulations allow the sealant/adhesive material to "squeeze-out" of the spot weld "tip" area between substrates thus enabling the conductive fillers to bridge the gap between the substrates and provide the low resistance required for proper resistance welding. Alternatively, formulations having higher green state viscosities tend to improve the mechanical properties of the sealant/adhesive post-cure as well as improving processing, handling and packaging requirements. However, sealants/adhesives with this higher green-state viscosity have less of an ability to "squeeze-out" sufficiently to allow the metal substrates to engage the conductive fillers, presenting challenges to resistance welding.

Conductive fillers typically used in the sealant/adhesive field for improving the weldability are most often encapsulated by the non-conductive polymeric materials, wetting agents, plasticizers and the like, that are used to provide strength and corrosion resistance. These encapsulations of the conductive fillers inhibit and/or limit the material from being "conductive" in its supplied form. Only during the pressure applied by the resistance welding and the displacement of the adhesive/sealant from the applied pressure does the material become thin enough to engage the conductive materials to provide for a good weld condition.

Various non-conductive fibrous materials (e.g., cellulose, Kevlar, polyethylene, glass, etc.) are also very useful in sealant/adhesive formulations. In the green state, fibers provide flow control, dimensional stability, die swell control and cracking resistance to the sealant/adhesive. Unfortunately, these nonconductive fibers, have a tendency to prevent the sealant/adhesive material from moving away or adequately "squeezing-out" during the applied pressure from the spot weld. Furthermore, the fibers may prevent adequate bridging of the gap between the weld substrates, thus, detrimentally increasing the electrical resistance. Conductive fibers, such as carbon fiber may help to remedy some of these issues, but they tend to be expensive and fragile in the mixing and forming processes. Nickel coated glass spheres improve electrical conductivity well at high loading levels but will crush under the applied pressure of a spot/resistance weld which detrimentally breaks up the conductive path needed for a proper spot/resistance weld.

It would thus be desirable to provide a sealant/adhesive formulation that overcomes the issues identified above to make a high-strength, highly weldable material.

SUMMARY OF THE INVENTION

The present teachings meet some or all of the above needs by providing for a formulation comprising: a plurality of discrete solid metallic portions within a material having a viscosity of greater than 10,000 Pa·s. The solid metallic portions may comprise a carbon steel material. The solid metallic portions may be spherical. The solid metallic portions may have a largest diameter of greater than about 0.01 mm and less than about 2.5 mm. The solid metallic portions may be present in an amount of at least about 2 percent by volume of the formulation. The solid metallic portions may be present in an amount of less than about 15 percent by volume of the formulation. At least one node may be formed where one or more solid metallic portions are present. The presence of at least one node provides a location adapted for spot welding. The at least one node may have a size of from about 0.10 mm to about 0.80 mm. The at least one node may have a size of from about 0.25 mm to about 0.50 mm. The formulation may be substantially free of graphite. The formulation may be weldable without use of any shunt means.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application No. 62/248,030, filed Oct. 29, 2015, the entirety of this application being hereby incorporated by reference for all purposes.

The teachings herein utilize a solid sphere/aggregate made of a conductive metal (e.g., carbon steel shot) with high strength properties and toughness. These properties provide the sealant/adhesive with penetrating "nodes" (0.25 mm to 0.50 mm) during the applied pressure for the spot weld that become low resistance electrical pathways that are far less affected by the sealant/adhesive viscosity. Not having to maintain a low viscosity allows the formulator to optimize the sealant/adhesive for better strength, handling, processing, dimensional stability and potentially shelf life.

Another important aspect of these teachings is that the conductive portions remain discrete among the formulated product. Discrete particles tend to have little influence on the properties of the base sealant/adhesive because the portions are large enough to not truly become homogenous at a molecular level. Thus, metallic portions can be added to an existing sealant/adhesive with little impact on the performance whereas small "filler like" particles (e.g., particles having a less than 50 microns) will influence the rheology of a formulation which alters wetting, adhesion, strength and squeeze-out.

Conductive particles of graphite are known in the field to improve spot/resistance welding of soft materials due to toughness of the graphite particle being sufficient enough to overcome the lower pressures created by low viscosity sealant/adhesive materials. However, graphite aggregates/layers are easily separated due to the nature of graphite itself (bonding between layers is weak via van der Waals bonds), and easily slide past each other. Higher viscosity formulations tuned for structural applications or ease of handling/processing cannot take advantage of the weak conductive graphite particles since the aggregates will exfoliate into layers that are reluctant to pierce through the material and form a conductive path through the sealant/adhesive.

The discrete metallic portions may comprise carbon steel, aluminum, brass, iron, stainless steel, bronze, copper, chrome steel, tin, or any conductive material. The discrete metallic portions may comprise a material with a coating. For example, the coating may be a material that assists in avoiding corrosion of the conductive material.

The discrete metallic portions may be solid. They may be hollow. The solid metallic portions may have a largest diameter of at least about 0.10 mm. The solid metallic portions may have a largest diameter of at least about 0.20 mm. The solid metallic portions may have a largest diameter of at least about 0.30 mm. The solid metallic portions may have a largest diameter of less than about 2.5 mm. The solid metallic portions may have a largest diameter of at least about 1.0 mm. The solid metallic portions may have a largest diameter of at least about 0.50 mm.

The formulation described herein allows for the weldability or improved weldability of adhesive and sealant formulations having higher viscosities than would traditionally be weldable. The formulations described herein may have a viscosity at room temperature of greater than 10,000 Pa·s (at room temperature and in its green state). The formulations described herein may have a viscosity at room temperature of greater than 30,000 Pa·s. The formulations described herein may have a viscosity at room temperature of greater than 50,000 Pa·s. The formulations described herein may have a viscosity at room temperature of greater than 60,000 Pa·s. The formulations described herein may have a viscosity at room temperature of greater than 70,000 Pa·s. The formulations described herein may have a viscosity at room temperature of greater than 80,000 Pa·s. Viscosity may be measured using ASTM D1084-16, ASTM D2393, or any test suitable for the adhesive or sealant selected.

The solid metallic portions may be present in an amount of at least about 1% by volume of the formulation. The solid metallic portions may be present in an amount of at least about 2% by volume of the formulation. The solid metallic portions may be present in an amount of at least about 5% by volume of the formulation. The solid metallic portions may be present in an amount of at least about 10% by volume of the formulation. The solid metallic portions may be present in an amount of less than about 30% by volume of the formulation. The solid metallic portions may be present in an amount of less than about 20% by volume of the formulation. The solid metallic portions may be present in an amount of less than about 15% by volume of the formulation. The volume percentage of the solid metallic portions may vary based upon the thickness of the adhesive or seal material and the area covered.

The size of the nodes formed by the discrete may vary and may depend on the material (e.g., structural or elastic), the viscosity of the material, the thickness of the material or the requirements of the materials requiring adhering and/or sealing. The at least one node may have a size of from about 0.10 mm to about 0.80 mm. The at least one node may have a size of from about 0.25 mm to about 0.50 mm.

The adhesive or sealant material described herein may pass shunt weld testing for metal to metal welding (with the material described herein located therebetween) by having resulting cycle loss of less than 2.0 or even less than 1.0 for welding that occurs anywhere between 2 inches to 6 inches from the shunt.

In general, the teachings herein provide for a weldable sealant or adhesive material that includes a plurality of discrete solid metallic portions, whereby the sealant or adhesive material can have a higher viscosity than traditional weldable materials due to the presence of the discrete metallic portions and their ability to create nodes for improved weldability.

The adhesive or sealant may be structural in nature (e.g., may form joints having lap shear strengths of greater than 1 MPa and, more normally, greater than 10 MPa). Alternatively, the adhesive may be an elastic adhesive or sealant material. Accordingly, the resulting material may be a structural or may be an elastic material.

The adhesive or sealant may likely include epoxy materials. Epoxy materials may be blended or pre-reacted in adduct form in various ratios. These materials may be formulated with polymerization and cross-linking schemes commensurate with typical epoxy chemistries. The adhesive or sealant may also include low odor and/or non-flammable polymeric materials. The adhesive or sealant may further include one or more materials for promoting adhesion and one or more materials to act as curing agents. Various polymeric materials may be included such as rubber materials, thermoplastic materials (polyethylene, polyurethane), impact modifiers, and the like. Additional materials may also be included in the adhesive or sealant including but not limited to antioxidants, stabilizers, solvents, initiators and crosslinkers.

The adhesive or sealant may include one or more liquids or powders to impart a flame retardancy to the adhesive or sealant. Useful fire retardants include, halogenated polymers, other halogenated materials, materials (e.g. polymers) including phosphorous, bromine, chlorine, oxide and combinations thereof. Exemplary flame retardants include, without limitation, chloroalkyl phosphate, dimethyl methylphosphonate, bromine-phosphorus compounds, ammonium polyphosphate, neopentylbromide polyether, brominated polyether, antimony oxide, calcium metaborate, chlorinated paraffin, brominated toluene, hexabromobenzene, antimony trioxide, graphite (e.g. expandable graphite), combinations thereof or the like. Other flame retardants that may be used include tricresyl phosphate and aluminum-trihydrate (ATH).

Examples of phosphorus containing fire retardants that may be used include red phosphorus, ammonium phosphates such as polyphosphates, melamine phosphates or pyrophosphate. The metal oxide, hydroxide or hydrate fire retardant may be any know metal containing fire retardant. Preferred materials include aluminum tri-hydrate and magnesium hydroxide.

The adhesive or sealant may further include one or more impact modifiers for improving the toughness of the adhesive or sealant. The impact modifiers may be present in an amount of at least 1%, at least 5%, at least 10%, at least 20% or even at least 25% by weight of the total adhesive or sealant composition. The impact modifiers may be present in an amount of less than 40%, less than 30%, less than 20%, or even less than 10% by weight of the total adhesive or sealant composition. A structural material may include from about 5% to about 20% by weight of impact modifiers. An elastic material may include from about 15% to about 30% by weight of impact modifiers.

The adhesive or sealant may also include one or more elastomers. The elastomers may be present in an amount of at least 5%, at least 10%, at least 20% or even at least 30% by weight of the adhesive or sealant composition. The elastomers may be present in an amount of less than 50%, less than 40%, less than 30% or even less than 20% by weight of the adhesive or sealant composition. A structural material may include from about 7% to about 20% by weight of one or more elastomers. An elastic material may include from about 25% to about 40% by weight of one or more elastomers. The one or more elastomers may be one or any combination of chlorosulfonated polyethylene, chlorinated polyethylene, carboxy-terminated butadiene-acrylonitrile copolymers, vinyl-terminated butadiene-acrylonitrile copolymers, styrene-butadiene-styrene copolymers, polychloroprene, or acrylonitrile-butadiene rubber.

The adhesive or sealant may further include any number of toughening agents, stabilizers, catalysts, adhesion promoters and/or fillers. Any one, or any combination of these additional materials may be present in an amount of at least 2%, at least 5%, at least 10% or even at least 15% by weight of the composition. Any one, or any combination of these additional materials may be present in an amount of less than 20%, less than 15%, or even less than 10% by weight of the composition. A structural material may include from about 5% to about 15% by weight of one or any combination of these additional materials. An elastic material may include from about 5% to about 10% by weight of one or any combination of these additional materials.

The impact modifier may include one or more core/shell polymers. As used herein, the term core/shell polymer describes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems. The first polymeric material, the second polymeric material or both of the core/shell impact modifier include or are substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like. It may be desirable for the glass transition temperature of the first or core polymeric material to be below 23° C. while the glass temperature of the second or shell polymeric material to be above 23° C., although not required.

Examples of useful core-shell graft copolymers are those where hard containing compounds, such as styrene, acrylonitrile or methyl methacrylate, are grafted onto core made from polymers of soft or elastomeric containing compounds such as butadiene or butyl acrylate. U.S. Pat. No. 3,985,703, which is herein incorporated by reference, describes useful core-shell polymers, the cores of which are made from butyl acrylate but can be based on ethyl isobutyl, 2-ethylhexyl or other alkyl acrylates or mixtures thereof. The core polymer, may also include other copolymerizable containing compounds, such as styrene, vinyl acetate, methyl methacrylate, butadiene, isoprene, or the like. The shell portion may be polymerized from methyl methacrylate and optionally other alkyl methacrylates, such as ethyl, butyl, or mixtures thereof methacrylates. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

The adhesive or sealant may also include one or more additional polymer and/or copolymer materials, such as thermoplastics, elastomers, plastomers, combinations thereof or the like. The adhesive or sealant may include polyurethanes. Polymers that might be appropriately incorporated into the adhesive or sealant include epoxies. Combinations of epoxies and polyurethanes may be utilized. Combinations of epoxies and acrylates (e.g., methacrylates) may be utilized. Silane-modified polymers may be included.

One or more additional polymeric materials may be included. Such polymeric materials may include but are not limited to halogenated polymers, polycarbonates, polyketones, urethanes, polyesters, silanes, sulfones, allyls, olefins, styrenes, acrylates, methacrylates, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polysiloxane, polyether, polyphosphazine, polyimide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polymethacrylate.

The adhesive or sealant may include a curing agent (e.g., an initiator). Examples of suitable curing agents include materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. The curing agent may be a peroxide or sulfur curing agent. An accelerator for the curing agents (e.g., a modified or unmodified urea such as methylene diphenyl bis urea, an imidazole or a combination thereof) may also be provided for preparing the adhesive or sealant.

The adhesive or sealant material may preferably cure at room temperature with no additional stimulus. The adhesive or sealant material may undergo an induction cure, a microwave cure, an ultra-violet activated cure, or a moisture cure, any of which may occur at room temperature or at an elevated temperature. The adhesive or sealant may cure via a redox reaction cure system. The adhesive or sealant material may comprise a two-component cure system wherein cure occurs upon mixing of the two-components. Typically, the adhesive or sealant material cures at temperatures in the range of about 15° C. to about 40° C.

During manufacture, the adhesive or sealant material may be formed in its green state by die-cutting, extrusion, injection molding, calendaring, hand shaping, or by means of gravity. The discrete metallic portions may be located onto an extruded adhesive or sealant and then calendar rolled and pressed into the material to prevent exposure of the metallic portions that could cause corrosion. The discrete metallic portions may be mixed directly into the adhesive or sealant.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at ""'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1. Teachings of concentrations in the examples may be varied within about 25% (or higher) of the stated values and similar results are expected. Moreover, such compositions of the examples may be employed successfully in the present methods.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A weldable formulation comprising: a plurality of discrete solid carbon steel spheres, each sphere having a largest diameter of greater than 0.20 mm and less than about 2.5 mm, the spheres being located within an epoxy-based material having a viscosity of greater than 50,000 Pa·s in its green state at room temperature, wherein the plurality of discrete spheres form at least one node for welding the material to a surface.

2. The formulation of claim 1, wherein the spheres are present in an amount of at least about 2% by volume of the formulation.

3. The formulation of claim 2, wherein the spheres are present in an amount of less than about 15% percent by volume of the formulation.

4. The formulation of claim 1, wherein the formulation is substantially free of graphite.

5. The formulation of claim 2, wherein the material is a structural adhesive material that includes about 5% to about 20% by weight of impact modifiers and about 7% to about 20% by weight of one or more elastomers, and the structural adhesive material forms joints having a lap shear strength of greater than 1 MPa.

6. The formulation of claim 5, wherein the material has a viscosity of greater than 60,000 Pa·s in its green state at room temperature.

7. The formulation of claim 1, wherein the at least one node has a size of from about 0.25 mm to about 0.50 mm.

8. The formulation of claim 1, wherein the material has a viscosity of greater than 70,000 Pa·s in its green state at room temperature.

9. The formulation of claim 1, wherein the material is an elastic sealant material that includes about 15% to about 30% by weight of impact modifiers and about 25% to about 40% by weight of one or more elastomers, and the elastic sealant material seals a gap between the surface and an opposing substrate.

10. The formulation of claim 1, wherein the material is cured via a microwave cure, an ultra-violet activation cure, or a moisture cure.

11. The formulation of claim 1, wherein the material is die cut in its green state.

12. The formulation of claim 2, wherein the spheres are calendar rolled and pressed into the material to prevent exposure of the metallic portions.

13. The formulation of claim 1, wherein the material cures upon exposure to a temperature above ambient temperature.

14. The formulation of claim 1, wherein the material cures at room temperature.

15. The formulation of claim 1, wherein the spheres are present in an amount of less than about 30% percent by volume of the formulation.

16. The formulation of claim 15, wherein the material passes shunt weld testing for metal-to-metal welding by having a resulting cycle loss of less than 2.0 for welding that occurs anywhere between 2 inches to 6 inches from the shunt.

17. The formulation of claim 1, wherein the material is extruded first and the plurality of spheres are embedded in the material post-extrusion.

18. The formulation of claim 1, wherein each of the plurality of spheres includes a coating.

19. The formulation of claim 1, wherein the material is substantially free of any fibrous additives.

* * * * *

UNITED STATES PATENT AND TRADEMARK OFFICE
CERTIFICATE OF CORRECTION

PATENT NO. : 11,097,378 B2
APPLICATION NO. : 15/764628
DATED : August 24, 2021
INVENTOR(S) : Jeffrey R. Apfel Page 1 of 1

It is certified that error appears in the above-identified patent and that said Letters Patent is hereby corrected as shown below:

On the Title Page

Item (56) U.S. PATENT DOCUMENTS
Insert --4,431,465 A 2/1984 Howard--
Insert --5,591,034 A 01/1997 Ameen--

Item (56) FOREIGN PATENT DOCUMENTS
Insert --GB 2143533 A1 02/1985--
Insert --JP H0699541 A1 04/1994--
Insert --JP H06198802 A1 07/1994--

Item (56) OTHER PUBLICATIONS
Insert --PCT International Search Report & Written Opinion dated January 12, 2017, Application No. PCT/US2016/059453--

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*